(12) United States Patent
Rodriguez

(10) Patent No.: US 7,455,877 B2
(45) Date of Patent: Nov. 25, 2008

(54) VEHICLE IDENTIFICATION MARKING SYSTEM

(75) Inventor: Milton Rodriguez, Cheshire, CT (US)

(73) Assignee: Vin Mark Security Services, LLC, Cheshire, CT (US)

( * ) Notice: Subject to any disclaimer, the term of this patent is extended or adjusted under 35 U.S.C. 154(b) by 914 days.

(21) Appl. No.: 10/707,183

(22) Filed: Nov. 25, 2003

(65) Prior Publication Data
US 2005/0112276 A1 May 26, 2005

(51) Int. Cl.
B05B 5/00 (2006.01)
(52) U.S. Cl. .................. 427/7; 427/157; 427/272; 427/282; 427/402; 427/258; 106/31.01
(58) Field of Classification Search .............. 427/7, 427/157, 272, 264, 258, 331, 282, 402, 429; 106/31.01
See application file for complete search history.

(56) References Cited

U.S. PATENT DOCUMENTS

| | | | | |
|---|---|---|---|---|
| 4,927,663 A | * | 5/1990 | Small et al. | 427/500 |
| 5,104,711 A | * | 4/1992 | Marsek | 428/78 |
| 5,151,572 A | * | 9/1992 | Jack | 219/121.69 |
| 5,759,613 A | * | 6/1998 | Howse et al. | 427/7 |
| 5,885,677 A | * | 3/1999 | Gosselin et al. | 428/40.1 |
| 6,358,563 B1 | * | 3/2002 | Van Duynhoven | 427/282 |
| 6,933,014 B1 | * | 8/2005 | Wynne | 427/272 |
| 2002/0114929 A1 | * | 8/2002 | Liu et al. | 428/195 |
| 2002/0176982 A1 | * | 11/2002 | Rohrbaugh et al. | 428/323 |

* cited by examiner

Primary Examiner—Michael Cleveland
Assistant Examiner—Briget P Ngampa
(74) Attorney, Agent, or Firm—DeLio & Peterson, LLC; Peter W. Peterson

(57) ABSTRACT

A method of identifying an object comprising providing an vehicle having on a surface thereof at least one layer of paint, such as a urethane-based paint. A unique alphanumeric identification is applied to the paint layer with a fluorescent material at a selected unrevealed location thereon. The fluorescent material is permitted to migrate into the at least one paint layer, while an excess amount of fluorescent material remains on the at least one paint layer. Thereupon, the excess amount of fluorescent material is removed from the at least one paint layer with a solvent. The unique discrete identification created by fluorescent material migrated into the at least one paint layer is visible at an acute angle to the object surface without use of an ultraviolet light, while being substantially invisible at an angle normal to the object surface.

14 Claims, 3 Drawing Sheets

VEHICLE IDENTIFICATION MARKING SYSTEM

BACKGROUND OF INVENTION

1. Field of the Invention

This invention relates to a marking system for identifying vehicles and other objects and, in particular, to a marking system for creating near invisible unique alphanumeric identification into the surface layers of such vehicles or other objects.

2. Description of Related Art

Vehicle identification numbers (VIN) and hull identification numbers (HIN) have been used for many years on motor vehicles and boats, respectively, to provide a unique alphanumeric identification for the vehicle. These VIN and HIN alphanumeric identifiers are useful in determining whether the vehicles are properly registered and also to locate and return stolen vehicles. Federal and state laws have required the marking of VINs on motor vehicles and HINs on boats for this purpose. These VINs and HINs are generally applied to the vehicle by the manufacturer in accordance with standards which permit the identification of the manufacturer and the particular vehicle and, optionally, with dates of manufacture and equipment on the vehicle. In the case of land vehicles, federal law has required the VIN to be marked on several locations on the vehicle body and on key vehicle parts. Federal law has also required the HIN to be marked on boats in a manner that is both visible and that will show any attempt to remove or alter the number.

It has also become common to mark VINs on other parts of a motor vehicle, beyond those required by federal law. For example, VIN can be etched or otherwise marked onto the glass on a motor vehicle to permit the tracking of parts stripped from stolen vehicles. The system employed by Vice Script Incorporated of Cheshire, Conn., has been particularly successful in this regard.

Notwithstanding the marking requirements for such vehicles, the location of the VIN and HIN indicia is generally known to thieves. As a result, after a vehicle is stolen, attempts are often made to remove or alter the VIN or HIN indicia and, in some instances, to substitute false numbers, to disguise the fact that the vehicle is stolen.

It would be useful to be able to mark a unique identifier on a vehicle or other object in a manner and location that is difficult to detect by a thief, yet still lends itself to easy identification in the event that the object is recovered.

SUMMARY OF INVENTION

Bearing in mind the problems and deficiencies of the prior art, it is therefore an object of the present invention to provide an improved vehicle identification marking system.

It is another object of the present invention to provide a vehicle identification marking system that may be applied to a secret location on the vehicle.

It is a further object of the present invention to provide a vehicle identification marking system in which the identification is substantially invisible in daylight when viewed at an angle normal to the object's surface, yet visible at an acute angle.

It is another object of the present invention to provide a vehicle identification marking system which may be embedded in the surface of a vehicle, such as in one or more paint layers on the surface.

It is a further object of the present invention to provide a vehicle identification marking system in which the identification remains even if an upper paint layer is removed, or if the surface is repainted.

It is another object of the present invention to provide an improved vehicle identification marking system which may be used on bare metal, painted surfaces and on fiberglass.

It is yet another object of the present invention to provide a secret vehicle identification which may be readily applied in ambient conditions.

The above and other objects, which will be apparent to those skilled in the art, are achieved in the present invention which is directed to a method of tracking objects comprising causing a unique identification to be marked onto a surface of an object at a location other than that marked by the manufacturer of the object, and recording the unique identification of the object in a database. The method then further includes maintaining the database containing the unique identification and object description for access on a network by: i) an owner of the object to record information regarding theft of the object and ii) an authorized person to search for information regarding theft of the object. Typically, the object is a vehicle and the unique identification is the same identification assigned by a manufacturer of the vehicle.

The object may be a motor vehicle, and the paint layer is over a metallic surface of the vehicle. The method is particularly useful where the paint comprises a urethane-based paint. Preferably, the object has thereon a plurality of layers of paint on the surface. The unique discrete identification is applied to an upper paint layer and the fluorescent material migrates through the upper paint layer and into at least one lower paint layer, while an excess amount of fluorescent material remains on the upper paint layer. The object and fluorescent may remain at about room temperature throughout the process.

Preferably, the fluorescent material is a liquid, for example, a nonaqueous-based ultraviolet ink, and the solvent is a non-aqueous solvent. The unique discrete identification may be applied to the paint layer by brush and further by use of a stencil containing cut-outs of the discrete identification.

In another aspect, the invention is directed to a method of identifying an object comprising providing an object having on a surface thereof a plurality of layers of paint, preferably a urethane-based paint, determining a unique discrete identification for the object, and applying the unique discrete identification to an upper one of the plurality of paint layers with a fluorescent material. The fluorescent material is permitted to migrate through the upper paint layer and into at least one additional paint layer below the upper paint layer, while an excess amount of fluorescent material remains on the upper paint layer. The method then includes removing the excess amount of fluorescent material from the upper paint layer with a solvent, such that the unique discrete identification created by fluorescent material migrated into the at least one additional paint layer remains therein and is visible even upon removal of the upper paint layer, or even application of a further paint layer.

In a further aspect, the present invention provides a method of identifying an object comprising providing an object having on a surface thereof at least one layer of paint determining a unique discrete identification for the object, and applying at essentially room temperature the unique discrete identification to the at least one paint layer on the surface with a liquid fluorescent material using a brush. The fluorescent material is permitted to migrate into the at least one paint layer at essentially room temperature, while an excess amount of fluorescent material remains on the at least one paint layer. The excess amount of fluorescent material from the at least one paint layer is removed with a solvent, such that the unique discrete identification created by fluorescent material migrated into the at least one paint layer is visible.

Yet another aspect of the present invention provides a method of identifying an object comprising providing an object having on a surface thereof at least one layer of paint, and determining a unique alphanumeric identification for the object. A stencil is created of the unique alphanumeric identification by providing a stencil sheet having an adhesive backing layer attached to a release sheet, cutting the alphanumeric identification into the stencil sheet without cutting through the release sheet, and removing the stencil sheet with cut alphanumeric identification and adhesive backing layer from the release sheet. The stencil sheet with cut alphanumeric identification and adhesive backing layer is then placed onto a second adhesive layer, and the stencil sheet and adhesive backing layer without the cut alphanumeric identification from the second adhesive layer is then removed, creating cut-out openings on the stencil sheet and leaving the cut alphanumeric identification on the second adhesive layer. The stencil sheet and adhesive backing layer with the cut-out openings is subsequently placed on the at least one paint layer on the object surface, and a fluorescent material is applied to the stencil sheet through the cut-out openings and on to the at least one paint layer on the surface. The stencil sheet and adhesive backing layer are then removed from the object surface, leaving fluorescent material in the form of the unique alphanumeric identification on the at least one paint layer. The method then includes permitting the fluorescent material to migrate into the at least one paint layer, while an excess amount of fluorescent material remains on the at least one paint layer, and removing the excess amount of fluorescent material from the at least one paint layer, such that the unique alphanumeric identification created by fluorescent material migrated into the at least one paint layer is visible.

The present invention, in a further aspect, is directed to a method of secretly identifying a vehicle comprising, providing a vehicle having a surface, selecting a desired, unrevealed location on a portion of the vehicle surface. A unique discrete identification for the object is then applied to the unrevealed location on the vehicle surface with a marking fluid not normally visible in daylight when viewed normal to the vehicle surface. The marking fluid is permitted to become embedded in the vehicle surface in the form of the unique discrete identification at the unrevealed location, while leaving an excess amount of the marking fluid on the vehicle surface. The method then includes removing the excess amount of the marking fluid on the vehicle surface. The unique discrete identification formed by the embedded marking fluid in the vehicle surface is visible at the unrevealed location at an acute angle to the vehicle surface or by use of light other than daylight. The method also includes recording the unique discrete identification and the unrevealed location on the vehicle surface in a searchable database for retrieval in the event that the vehicle needs to be identified.

The vehicle surface may comprise a metal, so that the unique discrete identification formed by the marking fluid is embedded in the metal. Where the vehicle surface comprises a painted surface, such as a urethane-based paint, the unique discrete identification formed by the marking fluid is embedded in the paint on the surface. The vehicle surface may alternatively comprise fiberglass, so that the unique discrete identification formed by the marking fluid is embedded in the fiberglass.

BRIEF DESCRIPTION OF DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION

Figure 1:
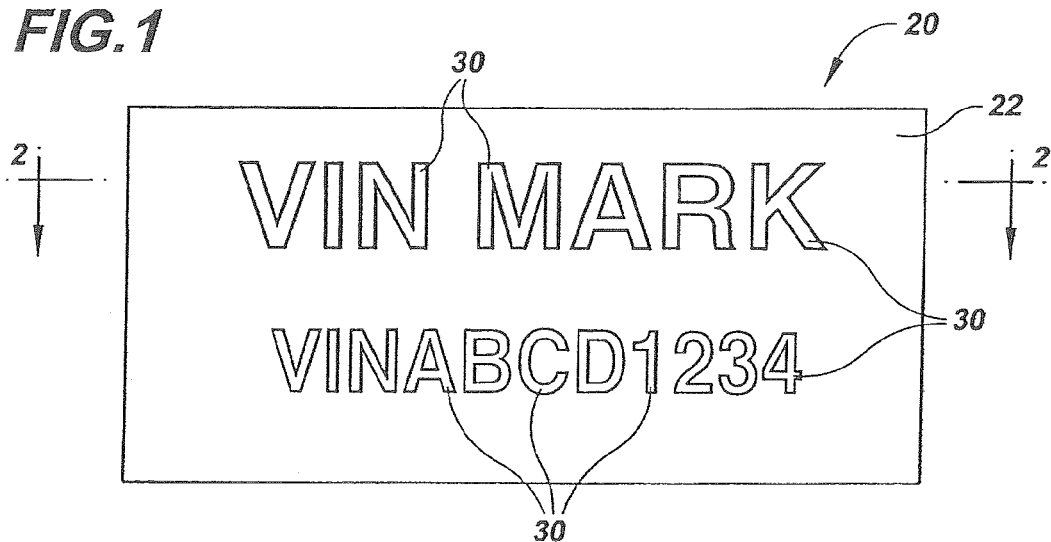
FIG. 1 is a top plan view of a stencil containing a partially cut unique alphanumeric identification.

In describing the preferred embodiment of the present invention, reference will be made herein to FIGS. 1-9 of the drawings in which like numerals refer to like features of the invention.

The present invention provides a method and system for creating virtually invisible yet readily identifiable discrete markings on a metal, painted metal or fiberglass surface of an object which permits a unique object identification to be marked thereon. While the invention is particularly useful for vehicles such as automobiles, trucks and boats, it may also be used for other objects that are vulnerable to theft or otherwise need to be tracked. The unique identification may be stored in a searchable database in the event that the object needs to be identified.

In order that the motor vehicle or other object may be tracked, a unique, discrete identification should be provided for the object. This discrete identification should be a separate symbol distinguishable from the background on which it is placed, for example, an alphanumeric symbol or a logo. In the case of land vehicles and boats, manufacturers typically provide VIN and HIN identifiers, respectively, which are marked on known locations on the vehicles and are also provided to governmental authorities upon registration of the vehicle. The present invention provides for such or other unique discrete identifiers to be marked on one or more additional, typically secret or unrevealed locations on the vehicle. Although vehicles are used in the preferred embodiment described below, it should be understood that the present invention could be broadly applied to any object having a suitable surface for marking.

The preferred marking material to be utilized in connection with the present invention is a fluorescent material that is not normally visible in daylight, without the use of an ultraviolet light source. Such fluorescent materials include fluorescent whitening agents such as coumarins, diamines formed by reaction of p-diaminostilbenedisulfonic acid and cyanuric chloride, p-distyrylbiphenyls, naphthotriazolylstilbenes and 1,3-disubstituted pyrazolines and is formulated into a suitable vehicle. Examples include alkylaminocoumarins, e.g., di-lower alkylaminocoumarins such as 7-dimethylamino-4-methylcoumarin, 7-diethylamino-4-methylcoumarin and the like. Other suitable materials include substituted diamines of paminostilbene such as 4,4'-bis[4-anilino-6-morpholino-s-triazin-2-yl)amino]2, 2'-stilbenedisulfonic acid, 4,4'-bis{{4-anilino-6-[bis(2-hydroxyethyl)amino]-s-triazin-2-yl}amino}-2,2'-stilbenedisulfonic acid, 4,4'-bis[(4,6-dianilino-s-triazin-2-yl)amino]-2,2'-stilbene-disulfonic acid, 4,4'-bis[[4-anilino-6-[(2-hydroxypropyl)amino]-s-triazin-2-yl]amino]-2,2'-stilbenedisulfonic acid disodium salt and 4,4'-bis[[4-anilino-6[N-2-hydroxyethyl-N-methylamino]-s-triazin-2-yl]amino]-2,2'-stilbenedisulfonic acid disodium salt, substituted p-distyrylbiphenyls such as 2,2-(4,4'-biphenylene divinylene)dibenzenesulfonic acid disodium salt, substituted naphthotriazolylstilbenes such as 4-(2H-naphtho[1,2-d]triazol-2-yl)-2-stilbenesulfonic acid sodium salt, and 1,3-disubstituted pyrazolines such as p-[3-(p-chlorophenyl)-2-pyrazolin-1-yl]benzenesulfonamide.

The essentially colorless fluorescent material is preferably supplied in the form of a liquid, preferably as a solution with a non-aqueous solvent base such as ketones or ethers, wherein the fluorescent material comprises from about 0.5% to 4% by weight of the solvent. A suitable fluorescent material is F-UV ultra violet ink supplied by Organic Products Company of Irving, Tex. Such fluorescent marking liquid may be used to apply the discrete identification in any typical manner, such as by brushing or spraying of a liquid. However, the preferred manner of applying the fluorescent marking liquid is via a stencil. A suitable stencil maker is a Lynx Sign Cutter, Model S-60 available from SignWarehouse.com of Sherman, Tex.

Figure 2:
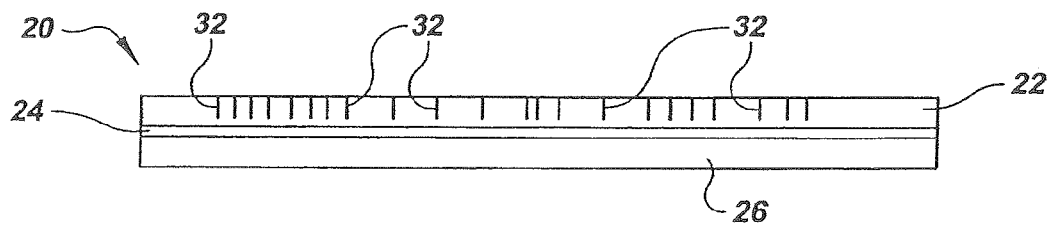
FIG. 2 is a side cross-sectional view of the stencil of FIG. 1, along lines 2-2.

As shown in FIGS. 1 and 2, stencil 20 comprises an otherwise conventional layer of stencil material 22 having on a bottom surface thereof an adhesive layer 24 which is protected by a release layer 26. The unique discrete identification 30 comprises a sequence of letters and numbers 30 which identify the entity applying or authorizing the identification as well as the unique identification of the vehicle itself. In the example shown in FIG. 1, VINMARK is the entity applying the identification, and VINabcd1234 is the unique vehicle identification number previously assigned by the manufacturer to the vehicle on which the marking of the present invention is to be applied. As shown in FIG. 2, the alphanumeric characters 30 are partially, but not completely, cut into the stencil layer 22 by slits 32 which extend from the top surface thereof.

Figure 3:
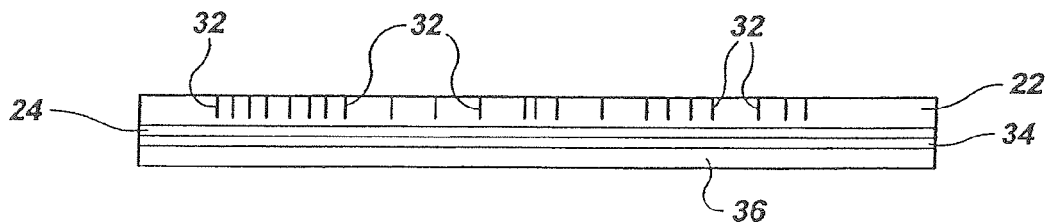
FIG. 3 is a side cross sectional view of the stencil of FIG. 2 with the release layer removed, and applied to an adhesive tape layer.
Figure 4:
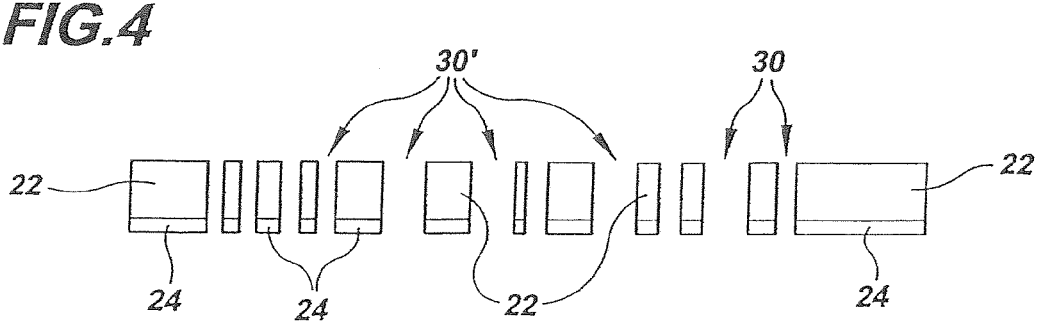
FIG. 4 is a side cross-sectional view of the stencil of FIG. 3 after the tape layer has been removed, leaving cut outs of the alphanumeric identification.

In order to apply the stencil to the surface of the vehicle, the release layer is removed and, as shown in FIG. 3, the remaining stencil sheet 22 and adhesive layer 24 are applied to another adhesive layer 34. Preferably, conventional masking tape is employed which includes a tape layer 36 on which the masking tape adhesive 34 is applied. To create the cutouts of the alphanumeric characters 30, the stencil material 22 and adhesive layer 24 are carefully peeled off of the masking tape adhesive layer 34 so that the stencil portions of the characters 30 remain on the masking tape, while the remaining stencil now has cutout openings 30' where the alphanumeric characters 30 have been removed, as shown in FIG. 4. The stencil 22 and adhesive layer 24 are then ready to be applied to a surface of a vehicle.

The surface on which the identification of the present invention may be applied can be a bare metal surface, such as that on an engine block or unpainted underbody part of a motor vehicle. In the case of a boat, the surface may be fiberglass, which generally comprises a gel coat over a fiberglass-reinforced core. Such fiberglass systems typically use polyester or epoxy resin systems, and the gel-coat resin may additionally include calcium carbonate, aluminum trihydrate, talc, silicate particles, titanium dioxide and colored pigment. In the case of automobiles or trucks, the marking may be applied to a painted body surface, which comprises one or more layers of paint over a metal, fiberglass or plastic body panel. In all instances, it is preferred that the marking be applied to a secret, unrevealed and unobtrusive location on a vehicle such as at the lower end of a fender or door panel. Regardless of the type of surface to which the markings are to be applied, it should be well cleaned with conventional cleaning products, preferably a solvent, to remove oil and grease therefrom.

Figure 5:
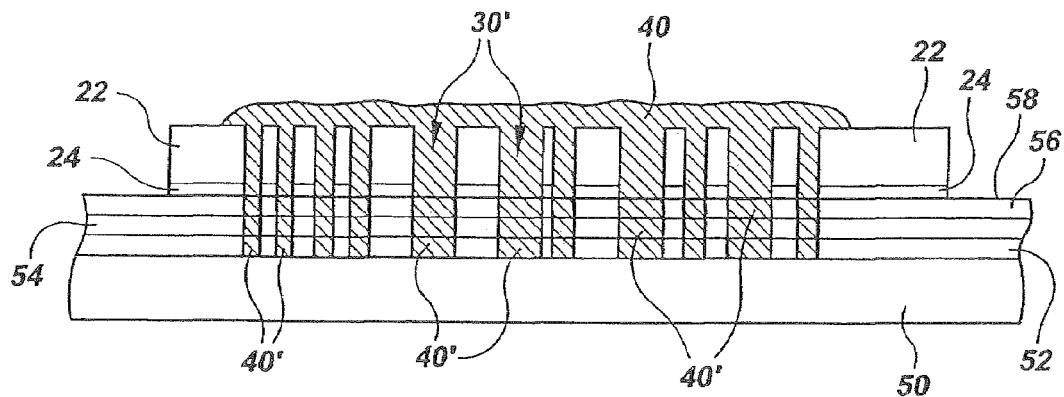
FIG. 5 is a side cross-sectional view of the stencil of FIG. 4 applied to a painted surface, with a fluorescent marking material applied over the stencil cut-outs.
Figure 6:
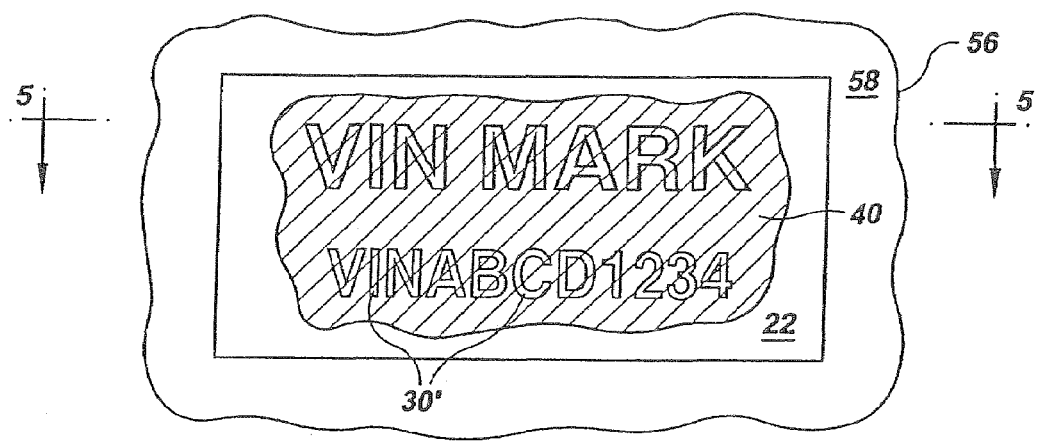
FIG. 6 is a top plan view of the stencil and marking material of FIG. 5.

As shown in FIGS. 5 and 6, the stencil and adhesive layer 24 are applied firmly to the upper surface 58 of a painted body panel comprising a sheet metal panel 50 over which there is applied a primer paint layer 52, a primary or base color paint layer 54, and a topcoat paint layer 56, such as a clear coat layer. Typically, each of these layers may be applied in multiple coats. The base and top (clear) coat paint layers are typically a urethane compound or system such as a polyurethane, wherein the base paint layer contains the color pigment, optionally with metal flakes dispersed therein. The primer layer is a corrosion inhibitive layer, typically also a urethane system. The total thickness of all of the paint layers is typically less than 0.010 in. (0.25 mm), in the range of about 0.003 in. (0.075 mm) to about 0.006 in. (0.15 mm), with each paint layer being in the range of about 0.0005 in. (0.0125 mm) to about 0.002 in (0.05 mm).

Figure 7:
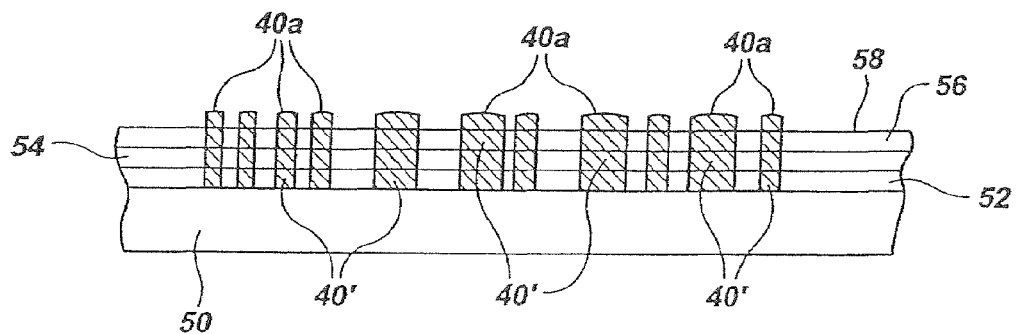
FIG. 7 is a side cross-sectional view of the painted surface of FIGS. 5 and 6 after the stencil has been removed and showing excess marking material on the painted surface.

After the stencil adhesive layer 24 is applied to the vehicle surface, the colorless fluorescent marking liquid 40 is applied into the cutout openings 30' for the alphanumeric identification, as also shown in FIGS. 5 and 6. The marking fluid 40 is applied normally in an excessive amount in and above the alphanumeric cutouts 30'. Preferable, a brush is used to apply the fluorescent marking fluid 40 to the stencil. It has been found that the fluorescent marking liquid migrates through the one or more paint layers and becomes embedded therein without substantial horizontal migration, so that the unique identification remains distinct. After permitting the marking fluid to dry for a predetermined time, for example, 5 minutes, the stencil 22 and adhesive layer 24 are then removed, leaving the marking fluid portion 40a above the upper surface 58 of the body panel (FIG. 7). Although the application of heat may accelerate the drying and migration process, it has been found that the application of the marking liquid may be done without any added heat at essentially room temperature i.e., approximately 25 degrees C. or even lower temperatures.

Figure 8:
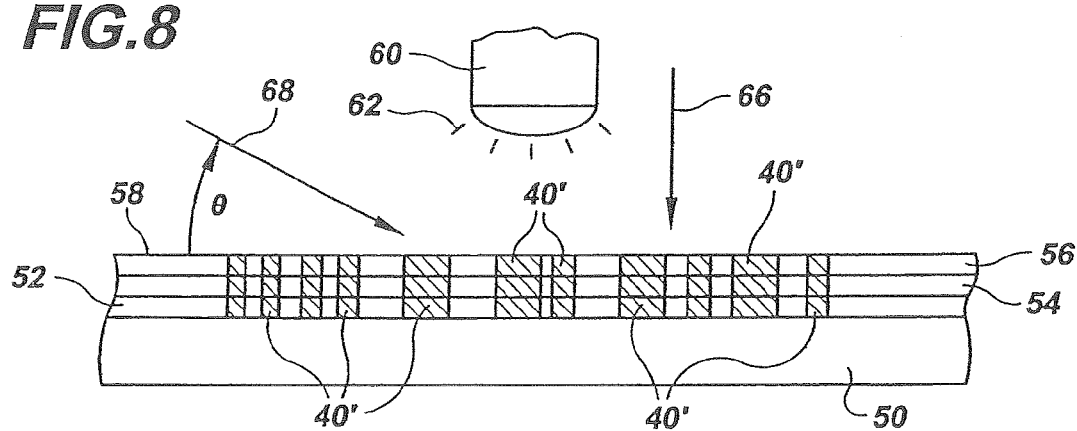
FIG. 8 is a side cross sectional view of the painted surface of FIG. 7 after removal of the excess marking material, and showing the viewing of the alphanumeric identification embedded in the paint layers utilizing an ultraviolet lamp.
Figure 9:
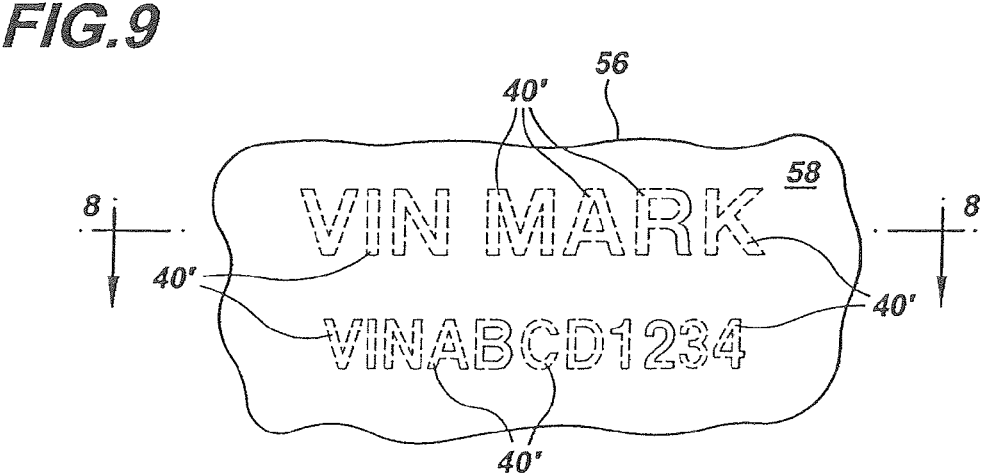
FIG. 9 is a top plan view of the embedded marking fluid of FIG. 8 showing the alphanumeric identification.

After removal of the stencil, additional time may be permitted so that the embedded marking liquid 40' may further migrate through and into preferably all of the paint layers 52, 54, 56. Subsequently, the portion of marking fluid 40a above the surface 50a is cleaned off or otherwise removed (FIG. 8). This may be done by applying alcohol or other suitable solvent to remove the dried marking fluid from the surface substantially completely.

Although the embedded alphanumeric characters 40' formed by the essentially colorless and invisible fluorescent marking liquid may be readily viewed by a use of a UV light source 60 which emits ultra violet light rays 62, it has been surprisingly found that the embedded marking fluid 40' forming the alphanumeric identification in accordance with the present invention may be viewed and identified without the need of a UV light source. While the alphanumeric characters are substantially invisible in daylight or normal indoor lighting when viewed in a direction normal to upper surface 58, as depicted by line 66 in FIG. 8, when viewed in a direction at an acute angle θ to the surface, as shown by line 68, the alphanumeric characters are identifiable even in daylight or normal indoor lighting, within the range of about 1 meter.

Thus, the marking system of the present invention may be applied to a visible decorative panel on the surface of a motor vehicle or other object without detracting from the object's appearance, since the embedded identification is virtually invisible. Only by viewing the specific mark closely and at an acute angle, may the unique alphanumeric identification be seen. Thieves who may normally remove or alter the VIN or HIN numbers at the known location on a vehicle would typically not be aware of the secret VIN or HIN identification as provided by the present invention.

Even more surprisingly, it has been found that even if the vehicle is repainted, the marking may still be visible. For example, some or all of the upper clear coat and pigmented base paint layers have been removed from areas marked in the manner described above and repainted, without further marking. In such instances, the presence of the embedded alphanumeric identifiers 40' in original layers, or even just the base or primer layer 52, remaining under the newly applied paint layers still permits the alphanumeric identification to be visible through the newly applied paint in the manner described in connection with FIG. 8. Thus vehicles that are repainted may still be tracked and identified by the marking system of the present invention.

In order to be able to track vehicles or objects marked in accordance with the present invention, the unique discrete identificaton as well as the location on the vehicle is stored in a searchable database. As used herein, the term searchable database refers to a computerized database in which a file containing the vehicle owner, vehicle characteristics, unique identification and location of application of the unique identification may be located once a marked portion of or the entire vehicle is retrieved. Typically, the searchable database is maintained by the entity applying the unique identification, and optionally such information may also be transmitted to governmental authorities.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of identifying an object comprising:
   providing an object having on a surface thereof a plurality of layers of paint;
   determining a unique discrete identification for the object;
   applying the unique discrete identification to an upper paint layer on the surface with a fluorescent material;
   permitting the fluorescent material to migrate through the upper paint layer and into at least one lower paint layer, while an excess amount of fluorescent material remains on the upper paint layer; and
   removing the excess amount of fluorescent material from the at least one paint layer with a solvent, such that the unique discrete identification created by fluorescent material migrated into the at least one paint layer is visible at an acute angle to the object surface without use of an ultraviolet light, while being substantially invisible at an angle normal to the object surface.

2. The method of claim 1 wherein the object and fluorescent remain at about room temperature.

3. The method of claim 1 wherein the fluorescent material is a liquid, and the solvent is a non-aqueous solvent.

4. The method of claim 1 wherein the object is a motor vehicle, and the paint layers are over a metallic surface of the vehicle.

5. The method of claim 1 wherein the unique discrete identification is an alphanumeric identification that is applied to the object at a selected unrevealed location thereon.

6. The method of claim 1 wherein the fluorescent material is a liquid, and the unique discrete identification is applied to the paint layer by brush.

7. The method of claim 1 wherein the fluorescent material is a liquid, and the unique discrete identification is applied to the paint layer by use of a stencil containing cut-outs of the discrete identification.

8. The method of claim 1 wherein the fluorescent material is a liquid, and the unique discrete identification is applied to the paint layer by use of a stencil containing cut-outs of an alphanumeric identification, and wherein the stencil is created by: a) providing a stencil sheet having an adhesive backing layer attached to a release sheet, b) cutting the alphanumeric identification into the stencil sheet without cutting through the release sheet, c) removing the stencil sheet with cut alphanumeric identification and adhesive backing layer from the release sheet, d) placing the stencil sheet with cut alphanumeric identification and adhesive hacking layer onto a second adhesive layer, and e) removing the stencil sheet and adhesive backing layer without the cut alphanumeric identification from the second adhesive layer, creating cut-out openings on the stencil sheet and leaving the cut alphanumeric identification on the second adhesive layer.

9. The method of claim 1 wherein the fluorescent material comprises a nonaqueous-based ultraviolet ink.

10. The method of claim 1 wherein the paint comprises a urethane-based paint.

11. A method of identifying a vehicle comprising;
    providing a vehicle having on a surface thereof a plurality of layers of paint;
    determining a unique discrete identification for vehicle;
    applying the unique discrete identification to an upper one of the plurality of paint layers with a fluorescent material;
    permitting the fluorescent material to migrate through the upper paint layer and into at least one additional paint layer below the upper paint layer, while an excess amount of fluorescent material remains on the upper paint layer; and
    removing the excess amount of fluorescent material from the upper paint layer with a solvent, such that the unique discrete identification created hy fluorescent material migrated into the at least one additional paint layer remains therein and is visible even upon removal of the upper paint layer.

12. The method of claim 11 wherein the unique discrete identification created by fluorescent material migrated into the at least one additional paint layer remains therein and is visible even upon removal of the upper paint layer and application of a further paint layer.

13. The method of claim 11 wherein the paint comprises a urethane-based paint.

14. The method of claim 11 further including directly viewing the upper paint layer at an acute angle to the vehicle surface without use of an ultraviolet light, such that the unique discrete identification created by fluorescent material is visible at an acute angle to the vehicle surface without the ultraviolet light, while being substantially invisible at an angle normal to the vehicle surface.

* * * * *

UNITED STATES PATENT AND TRADEMARK OFFICE
CERTIFICATE OF CORRECTION

PATENT NO.       : 7,455,877 B2                                          Page 1 of 1
APPLICATION NO.  : 10/707183
DATED            : November 25, 2008
INVENTOR(S)      : Milton Rodriguez It is certified that error appears in the above-identified patent and that said Letters Patent is hereby corrected as shown below:

Column 8, line 38, claim 8, delete "hacking" and substitute therefore -- backing --.

Column 8, line 51, claim 11, after "for" insert -- the --.

Column 8, line 62, claim 11, delete "hy" and substitute therefore -- by --.

Signed and Sealed this

Eighth Day of September, 2009

David J. Kappos
*Director of the United States Patent and Trademark Office*